Patented Nov. 11, 1924.

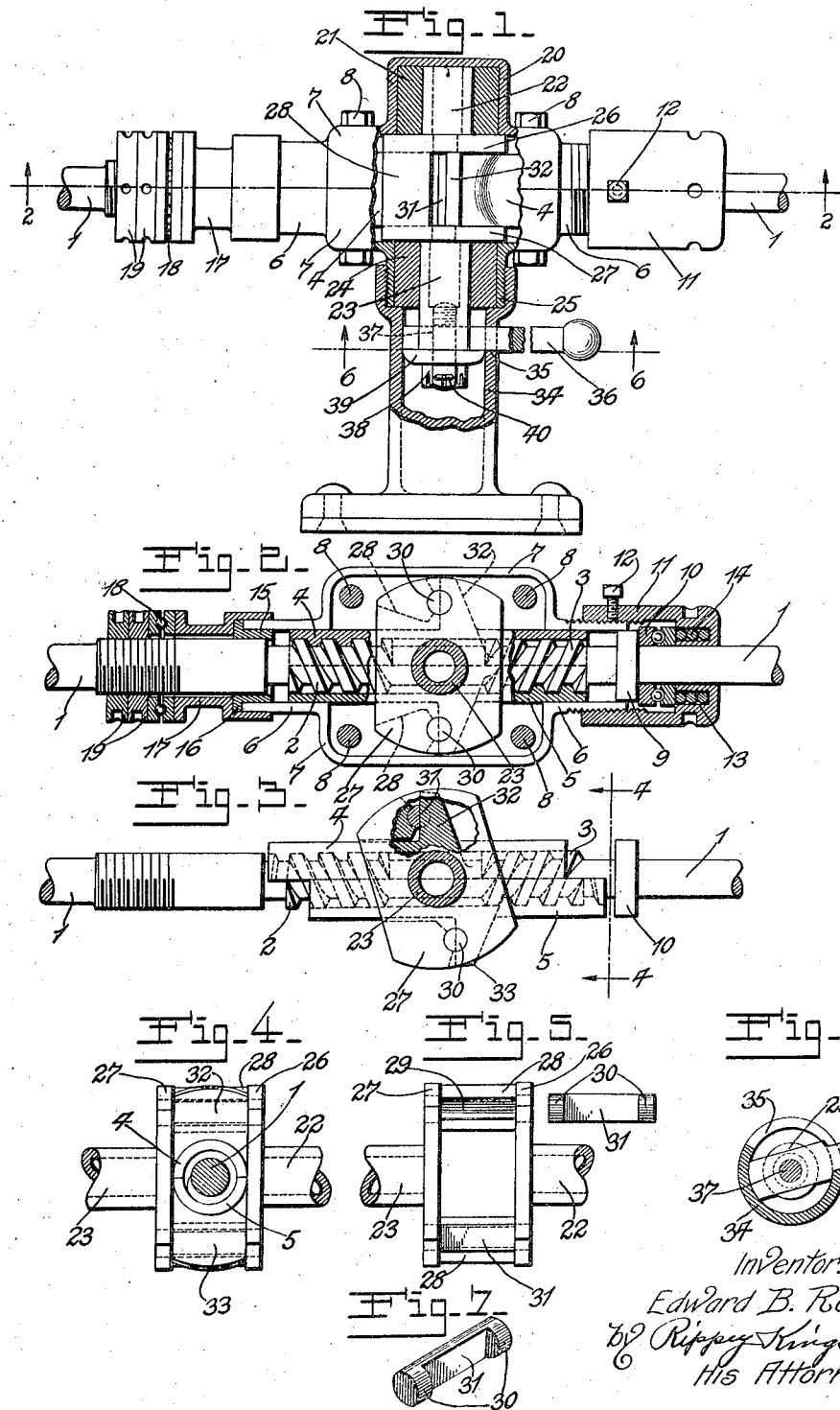

1,515,416

UNITED STATES PATENT OFFICE.

EDWARD B. ROTH, OF ST. LOUIS, MISSOURI, ASSIGNOR TO SIMPLEX STEERING GEAR CO., OF ST. LOUIS, MISSOURI, A COMMON-LAW TRUST.

STEERING DEVICE.

Application filed August 21, 1922. Serial No. 583,447.

*To all whom it may concern:*

Be it known that I, EDWARD B. ROTH, a citizen of the United States, and a resident of the city of St. Louis, and State of Missouri, have invented a new and useful Steering Device, of which the following is a specification.

This invention relates to steering devices for use on motor vehicles.

The device comprises a pair of cylindrical half nuts or sleeves, both which are supported at their opposite ends in bearings in which they are oppositely movable and which engage right and left hand threads respectively on the steering post. Each of the half nuts or sleeves is provided with a radial arm engaging against the flat bottom of a notch formed in a cooperating bearing pin supported by a crank in connection with a rockable shaft. Appropriate bearings are provided for the steering post in connection with a housing enclosing the parts above mentioned, and said bearings are capable of adjustment to adjust and hold the parts in proper relative adjustments or positions and to take up any wear that may accrue as a result of the use of the invention.

An object of the invention is to provide an improved steering device embodying the features mentioned and further embodying a novel form of cooperative connection between the arms of the half nuts or sleeves for facilitating the operation of the steering mechanism of which the rockable shaft constitutes a part.

Another object of the invention is to provide a steering device embodying novel and efficient means for maintaining the parts in proper operative adjustment and relationship.

Other objects of the invention will appear from the following description, reference being made to the drawing in which—

Fig. 1 is a bottom plan view of the invention with parts shown in section.

Fig. 2 is a sectional view on the line 2—2 of Fig. 1.

Fig. 3 is a view showing the half nuts or sleeves in connection with the steering post and the rockable shaft.

Fig. 4 is a sectional view on the line 4—4 of Fig. 3.

Fig. 5 is a view showing the construction of the crank on the rockable shaft with one of the notched bearing elements removed from one of the cranks.

Fig. 6 is a sectional view on the line 6—6 of Fig. 1.

Fig. 7 is a perspective view of one of the notched bearing elements.

In the embodiment of the invention shown the steering post 1 is provided with a right hand thread 2 and further toward the lower end of the shaft with a left hand thread 3. A half nut or sleeve 4 is interiorly threaded at its upper end for engagement with the right hand threads 2, and has a similar half nut or sleeve 5 that is interiorly threaded at its lower end for engagement with the left hand thread 3. The two half nuts or sleeves have their side edges in sliding engagement and are moved in opposite direction when the steering post 1 is rotated.

The half nuts or sleeves have their opposite ends mounted for sliding movements in opposite directions in bearings 6 formed in a housing composed of the two side members 7. The side members of the housing have extensions from their opposite ends forming the bearings 6. Bolts 8 extend through the housing and through the side wall thereof and secure the two members of the housing firmly together.

Near its lower end the steering post 1 is formed with a circumferential flange 9 operating against the upper member of an anti-friction thrust bearing 10. The extension of the housing containing the lower bearing 6 is exteriorly threaded and a cap 11 is screwed thereon and may be firmly held in any adjusted position by a set screw 12. The inside of the bottom of the cap has an annular groove 13 in which a strong coil spring 14 is seated and which exerts pressure against the lower member of the anti-friction thrust bearing 10. The pressure of the spring against the bearing may be varied as desired by changing the position of the cap 11 in connection with the housing.

The bearing 6 at the upper end of the housing encloses a bushing 15 for the steering post 1 and to serve as an abutment to limit upward movement of the half nuts or sleeves 4—5. The bushing 15 has a circumferential flange 16 on its upper end which is held seated against the end of the bearing 6 by a cylindrical member 17 which encloses the end of the bearing 6, and which is pressed to position by an anti-friction thrust bearing 18 held in proper adjustment by locking nuts 19 secured on the adjacent threaded portion of the steering post 1.

One of the side members of the housing is formed with a cup-shaped part 20 containing a bushing 21 in which the end member 22 of a tubular rockable shaft is journaled. The other portion 23 of said shaft is journaled in a bushing 24 in a tubular extension 25 from the opposite side wall of the housing. The steering post 1 extends between the two alined shaft portions 22—23. The shaft portions 22 and 23 are integrally united by the cranks with which the half nuts or sleeves 4 and 5 cooperate. The integral connection between said shaft portions 22 and 23 comprises a plate crank arm 26 integral with the shaft portion 22; a similar plate crank arm 27 integral with the inner end of the shaft portion 23; and cross connections 28 integrally uniting the crank arms 26 and 27. The plate crank arms 26 and 27 are relatively wide when viewed in side elevation (Figs. 2 and 3) and the integral connections 28 are relatively narrow so that they will not contact with the half nuts or sleeves in the ordinary operation of the steering device. The inner or lower face of each of the connections 28 is formed with a rounded longitudinal notch 29, said notches being in continuation of round holes formed through the cranks 26 and 27. A bearing element is supported by each of the cranks, said bearing elements extending through the holes in the cranks and seating in the rounded notches or grooves 29. As shown, each bearing element comprises a body with round end portions 30 seated in the round holes of the cranks 26 and 27 and a connecting portion 31 flat on one side and rounded on the other, and having the rounded sides seated in the rounded grooves or notches 29. Thus a proper mounting for the bearing elements is provided permitting them to turn freely and at the same time affording strong support therefor.

The half nut or sleeve 4 is provided with an integral radial arm 32 which is of approximately the same width as the distance between the crank arms 26 and 27. The radial arm 32 extends between the crank arms 26 and 27 and engages the flat surface of the bearing element 30—31, between the rounded end portions 30 thereof. Thus the bearing element is held in place and turns as the steering post is rotated. The lower half nut or sleeve 5 has a similar radial arm 33 having the same relationship to the crank arms 26 and 27 as does the arm 32, and similarly bearing against the flat surface of the thrust member 30 and 31.

The bearing 25 is exteriorly threaded and is screwed into the end of a support 34 rigidly mounted in connection with the chassis of the vehicle. The shaft portion 23 extends into the support 34. The support 34 is formed with a slot 35 extending for a proper distance circumferentially and receiving the lever 36 which is connected with the connecting rod (not shown) of the steering mechanism. The lever 36 is seated in a notch in the end of the shaft portion 23. A bolt 37 (Figs. 1 and 6) passes through a hole in the lever 36 and screws into the shaft portion 23. A nut 38 on the outer end of the bolt 37 presses the washer 39 against the lever 36 and holds the parts in proper adjustment. A cotter pin 40 engaging the nut and the bolt 37 prevents the nut from working loose.

From the foregoing it will be seen that my invention constitutes a highly efficient and satisfactory steering device in which the parts may be minutely and accurately adjusted and maintained in such relationship. The device is easy to operate, positive in its movements and is inexpensive to manufacture and install.

It is apparent that the specific features may be varied without departure from the nature and principle of the invention, and I do not restrict myself particularly except as set forth in the appended claims.

What I claim and desire to secure by Letters Patent is:—

1. A steering device, comprising a casing, bearings at the opposite ends of the casing, a pair of sliding members having their opposite ends mounted in said bearings, right hand threads on the inside of one of said members, left hand threads on the inside of the other member, a steering post extending into said casing and having right and left hand threads engaging with the threads on said sliding members respectively, an abutment shoulder on said steering post below said sliding members and said threads, a thrust bearing, a cap attached to one of said bearings, and a spring in said cap pressing said thrust bearing against said abutment shoulder.

2. A steering device, comprising a casing, bearings at the opposite ends of the casing, a pair of sliding members having their opposite ends mounted in said bearings, right hand threads on the inside of one of said members, left hand threads on the inside of the other member, a steering post extending into said casing and having right and left hand threads engaging with the threads on the sliding members respectively, an abutment shoulder on said steering post below said sliding members and said threads, a thrust bearing pressing against said abutment shoulder, a spring imparting pressure against said thrust bearing, and an adjustable support for said spring.

3. A steering device, comprising a casing, bearings at the opposite ends of said casing, a pair of sliding half nut members having their opposite ends mounted for sliding movements in said bearings and one of said members having right hand threads on its inside and the other having left hand threads on its inside, a steering post extending between said members and having right and left hand threads engaging the right and left hand threads respectively on said sliding members, two alined shaft portions on diametrically opposite sides and intermediate of the ends of said sliding members, a crank plate integral with each of said shaft portions, a pair of integral connections between said crank plates and embracing said sliding members between them, a rotary thrust member supported against each of said connections, an arm on each of said sliding members bearing against each of said thrust members, and means for connecting one of said shaft portions with a steering rod.

4. A steering device, comprising a casing, a steering post extending into the casing, a pair of half nut members journaled for sliding movements in the casing in opposite directions having right and left hand threaded connections respectively with the steering post and each having a projecting arm, two alined shaft portions on diametrically opposite sides of the casing intermediate of the ends of said nut members, a pair of crank devices rigidly uniting said shaft portions and embracing said nut members between them, a rotary thrust member mounted for operation between each of said crank devices and said projecting arms having rotary contact with one and sliding contact with the other and held from endwise movement by one of said parts, and means for connecting one of said shaft portions with a steering connecting rod.

5. In a steering device, a rockable shaft composed of two alined shaft portions spaced from each other, a steering post extending between said shaft portions, sliding half nut members between said shaft portions having right and left hand threaded engagement respectively with said steering post, bearings in which the ends of said sliding nut members are mounted at opposite sides of said shaft portions, a crank connecting said shaft portions adjacent to each of and intermediate of the ends of said sliding nut members and having a rounded groove therein, a rotary thrust member supported by each of said cranks and seated in said grooves and said thrust members having flat bearing or thrust surfaces, an arm on each of said sliding nut members bearing against the flat surfaces of each of said thrust members and holding said thrust members from endwise movement and means for connecting one of said shaft portions with a connecting rod.

6. A steering device, comprising oppositely movable half nut members, a steering post having right and left hand threaded engagement with said members respectively, a rockable shaft, spaced cranks on said shaft between which said nut members extend to opposite sides of said shaft, thrust members rotatively supported by said cranks and having notches between their ends provided with flat bottom walls constituting thrust surfaces, arms on said nut members bearing against the flat surfaces on said thrust members, and a lever device in connection with said shaft.

7. A steering device, comprising a shaft, a pair of cranks in connection with said shaft, a pair of rotary thrust members supported by said cranks and having notches between their ends, sliding half nut members, bearings supporting the ends of said nut members at opposite sides of said cranks, a steering post for actuating said nut members in opposite directions, an arm on each of said nut members seated in the notch in the corresponding thrust member, and a lever in connection with said shaft.

8. A steering device comprising a housing, bearings extending from the upper and lower ends of said housing respectively, a steering post extending through said housing and said bearings, a bushing in the upper bearing holding said steering post concentric in said bearing, a thrust bearing holding said bushing in said upper bearing, a thrust bearing for said steering post adjacent to said lower bearing, an adjustable device for supporting said second thrust bearing, a pair of sliding elements journaled in said upper and lower bearings, a rock shaft operative by said sliding elements, and means in connection with said rock shaft holding sliding elements from turning.

9. A steering device comprising a housing, bearings extending from the upper and lower ends of said housing respectively, a steering post extending through said housing and said bearings, a bushing in the upper bearing holding said steering post concentric in said bearing, a thrust bearing holding said bushing in said upper bearing, a thrust bearing for said steering post adjacent to said lower bearing, an adjustable device for supporting said second thrust bearing, a pair of sliding elements journaled in said upper and lower bearings having respectively right and left hand threaded engagement with said steering post, and a rock shaft operative by said sliding elements.

10. A steering device comprising a housing, bearings in the upper and lower ends of said housing respectively, a shaft extending transversely of said housing and journaled at opposite sides of the housing, a pair of cranks in connection with said shaft in said housing, a pair of rotary thrust members supported by said cranks and having notches with flat bottoms between their ends, sliding half nut members having their ends mounted in said bearings, a steering post for actuating said nut members in opposite directions, an arm on each of said nut members seated in the notch in the corresponding thrust member and bearing against the flat bottom of said notch, and an adjustable thrust bearing for said steering post.

11. A steering device, comprising two separate casing members, means for holding the casing members together, bearings at the opposite ends of the casing formed by said casing members, sliding elements journaled in said bearings, a steering post extending into the casing and having right and left hand threaded engagement with said sliding elements respectively, a thrust bearing for said steering post, means supported by one of said first-named bearings for supporting said thrust bearing, and a spring for exerting pressure against said thrust bearing.

12. A steering device comprising two separated housing members, means for holding said housing members together, bearings at the opposite ends of the housing formed by said housing members, two sliding half nuts journaled in said bearings, a steering post extending into the housing and having operative connection with said nut members for operating said nut members in opposite directions relatively, a thrust bearing for said steering post, an adjustable device supported by one of said first named bearings for supporting said thrust bearing, a rock shaft, a pair of cranks on said rock shaft holding said half nuts from turning, a rotary thrust member supported by each of said cranks and having notches with flat bottom walls between their ends, and an arm on each of said half nut members bearing against the bottom wall of the notch of the corresponding thrust member.

EDWARD B. ROTH.